United States Patent [19]
McCain

[11] 3,931,999
[45] Jan. 13, 1976

[54] APPARATUS FOR HYDRAULICALLY TRANSPORTING SOLIDS

[75] Inventor: David L. McCain, Ponca City, Okla.

[73] Assignee: Continental Oil Company, Ponca City, Okla.

[22] Filed: Nov. 4, 1974

[21] Appl. No.: 520,390

[52] U.S. Cl. .................. 302/14; 302/15; 302/35; 302/50; 417/38
[51] Int. Cl.² .................. B65G 53/30; B65G 53/66
[58] Field of Search .................. 302/14–16, 302/35, 42, 50; 299/18, 64; 417/36, 38, 42

[56] References Cited
UNITED STATES PATENTS

| | | | |
|---|---|---|---|
| 2,791,471 | 5/1957 | Clancey et al. | 302/14 |
| 3,314,730 | 4/1967 | Anderson et al. | 302/14 |
| 3,389,938 | 6/1968 | Frazier | 302/14 |

*Primary Examiner*—Evon C. Blunk
*Assistant Examiner*—Jeffrey V. Nase
*Attorney, Agent, or Firm*—William J. Miller

[57] ABSTRACT

Apparatus for forming a particulated solids-carrier liquid slurry and transporting it between first and second locations wherein a continuous stream of carrier liquid is flowed to the first location at a constant flow rate and particulated solids to be transported are injected directly into the carrier liquid so that a particulated solids-carrier liquid slurry is formed. The slurry is pumped to the second location at a flow rate such that the pressure level of the carrier liquid at the first location is maintained at a predetermined level thereby facilitating the direct injection of particulated solids thereinto.

3 Claims, 3 Drawing Figures

APPARATUS FOR HYDRAULICALLY TRANSPORTING SOLIDS

BACKGROUND OF THE INVENTION

1. Field of the Invention

This invention relates generally to methods and apparatus for hydraulically transporting solids, and more particularly, but not by way of limitation, to an improved method and apparatus for forming a particulated solids-carrier liquid slurry and transporting it between first and second locations.

2. Description of the Prior Art

In the mining and transport of minerals such as coal, hydraulic transport methods and apparatus have heretofore been developed and used wherein the solids to be transported are particulated, combined with a carrier liquid, and the resulting slurry is pumped to a terminal location where the solids are separated from the carrier liquid. Generally, the apparatus heretofore utilized has included at least a solids accumulator, an open mixing tank or sump wherein the pumpable slurry is formed and one or more pumps for pumping the slurry. Such prior apparatus are generally bulky and cannot be operated in applications where head room is limited, e.g., in mining low thin coal seams. Further, since prior art apparatus have included open solids-carrier liquid mixing chambers, spillage of the carrier liquid and solids can occur when the flow of solids to be transported increases.

By the present invention, an improved method of forming a particulated solids-carrier liquid slurry and transporting it between locations is provided which is carried out in relatively simple low profile apparatus including a closed carrier liquid-slurry circuit which apparatus is particularly suitable .Jr use in limited head room applications and which obviates spillage problems.

The method of the invention basically comprises the steps of flowing a continuous stream of carrier liquid to a first location at a constant flow rate, injecting the particulated solids to be transported directly into the carrier liquid at the first location so that a particulated solids-carrier liquid slurry is formed, pumping the solids-carrier liquid slurry to a second location, and controlling the rate at which the solids-carrier liquid slurry is pumped from the first location to the second location so that the pressure level of the carrier liquid at the first location is maintained at a predetermined level thereby facilitating the direct injection of the particulated solids thereinto. Apparatus for carrying out the method including a closed carrier liquid-slurry circuit is also provided by the invention.

It is, therefore, a general object of the present invention to provide an improved method and apparatus for hydraulically transporting solids.

A further object of the present invention is the provision of a method of hydraulically transporting particulated solids which can be carried out in a closed fluid circuit whereby spillage of the carrier liquid is minimized.

Another object of the present invention is the provision of a method of a hydraulically transporting particulated coal and simple economical apparatus for carrying out such method which can be utilized in thin coal seams and other locations where head room is limited.

Yet another object of the present invention is the provision of methods and apparatus for hydraulically transporting particulated solids wherein problems associated with plugging the transporting conduit due to too high a solids concentration or too low a slurry flow rate are generally obviated.

Other and further objects, features and advantages of the invention will be readily apparent to those skilled in the art upon a reading of the description of preferred embodiments which follows taken in conjunction with the accompanying drawings.

DESCRIPTION OF THE PREFERRED EMBODIMENTS

The improved method and apparatus of the present invention are useful in any application where it is desirable to transport particulated solids by suspending the solids in a carrier liquid and pumping the resulting slurry through a pipeline or conduit.

The present invention is particularly suitable for use in mining applications wherein coal or other mineral is continuously transported between locations in the mine or from a location in the mine to a location outside the mine.

Figure 1:
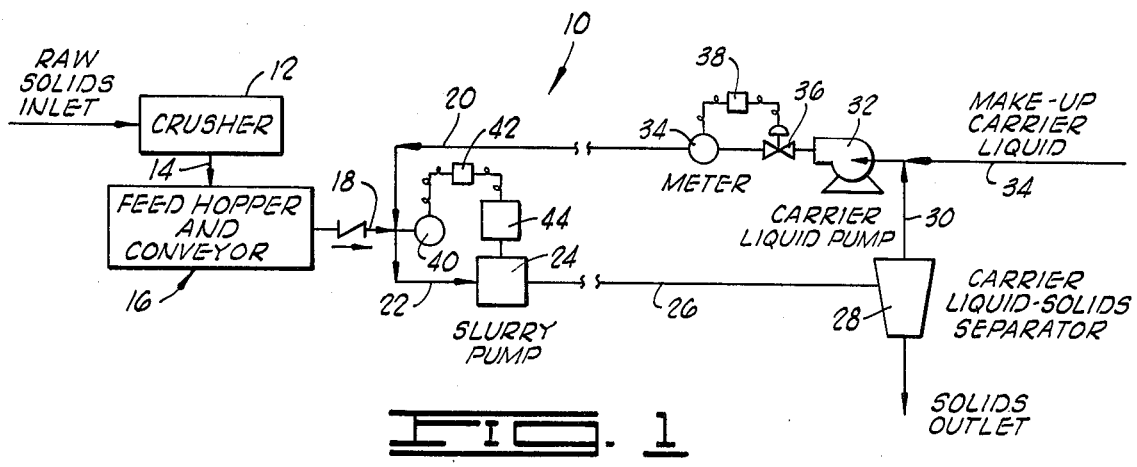
FIG. 1 is a diagrammatic illustration of apparatus for carrying out the methods of the present invention.

Referring to the drawings and particularly to FIG. 1, the improved apparatus of the present invention is illustrated diagrammatically and generally designated by the numeral 10. The apparatus 10 includes a solids crusher 12 which receives raw solids from a source thereof, such as a continuous mining machine, and particulates the raw solids to a size such that they can be suspended in a carrier liquid, i.e., so that the maximum particle size can be passed through the pumps and pipelines utilized. From the crusher 12 the particulated solids are conveyed by a conveyor 14 into a feed hopper and conveyor assembly, generally designated by the numeral 16. As will be described in detail hereinbelow, the feed hopper and conveyor assembly 16 includes a hopper for receiving particulated solids from the crusher 12 and at least one screw conveyor 18 which is connected to the conduit 20 or a closed chamber disposed in the conduit 20. A continuous stream of carrier liquid is flowed through the conduit 20 and particulated solids are injected thereinto by the conveyor 18. The solids-carrier liquid slurry formed is coneucted by a conduit 22 to the suction connection of a slurry pump 24. The discharge connection of the pump 24 is connected by a conduit 26 to a carrier liquid-solids separator 28 which can be a part of a full solids preparation plant or an intermediate processing location wherein the solids are removed from the slurry and withdrawn for further processing. The carrier liquid separated from the solids within the separator 28 is withdrawn and conducted therefrom by a conduit 30 to the suction connection of a carrier liquid pump 32. A conduit 34 is connected to the conduit 30 for providing make-up carrier liquid to the apparatus 10. The discharge connection of the carrier liquid pump 32 is connected to the conduit 20 so that carrier liquid is recycled through the conduit 20 to the slurry pump 24.

As will be understood, the crusher 12, feed hopper and converyor assembly 16 and slurry pump 24 are located at a first location from which it is desired to transport solids, and the carrier liquid-solids separator 28 and carrier liquid pump 32 are located at a second location to which the solids are transported. The conduits 20 and 26 are connected between the first and second locations, and can be pipelines or flexible hoses. When the apparatus 10 is used in mining operations for transporting particulated minerals such as coal, the crusher 12, feed hopper and conveyor assembly 16 and slurry pump 24 are generally mounted on a vehicle to facilitate movement of the apparatus in conjunction with a mining machine, and the conduits 20 and 26 include flexible hoses of excess length to permit the movement of the vehicle.

A liquid flowmeter 34 for measuring the flow rate of carrier liquid pumped by the pump 32 and a conventional flow rate control valve 36 are disposed in the conduit 20. A conventional flow rate controller 38 is operably connected between the meter 34 and the control valve 36 which functions to control the flow rate of carrier liquid pumped through the conduit 20 at a constant predetermined level.

A conventional pressure transmitting device 40 is connected to the conduit 20 at the first location at or near the intersection of the conduit 20 with the conveyor 18. The pressure transmitter 40 senses the pressure level of the carrier liquid within the conduit 20 and produces a signal proportional thereto. A conventional controller 42, operably connected to the transmitter 40 and to the driver 44 of the pump 24 functions to regulate the speed of the driver 44 and the flow rate of slurry pumped by the pump 24 so that the pressure level of the carrier liquid at or near the intersection of the conduit 20 and conveyor 18 is maintained at a predetermined low level, i.e., the flow rate of slurry pumped by the pump 24 equals the flow rate of carrier liquid flowing through the conduit 20 plus the flow rate of solids injected thereinto.

Figure 2:
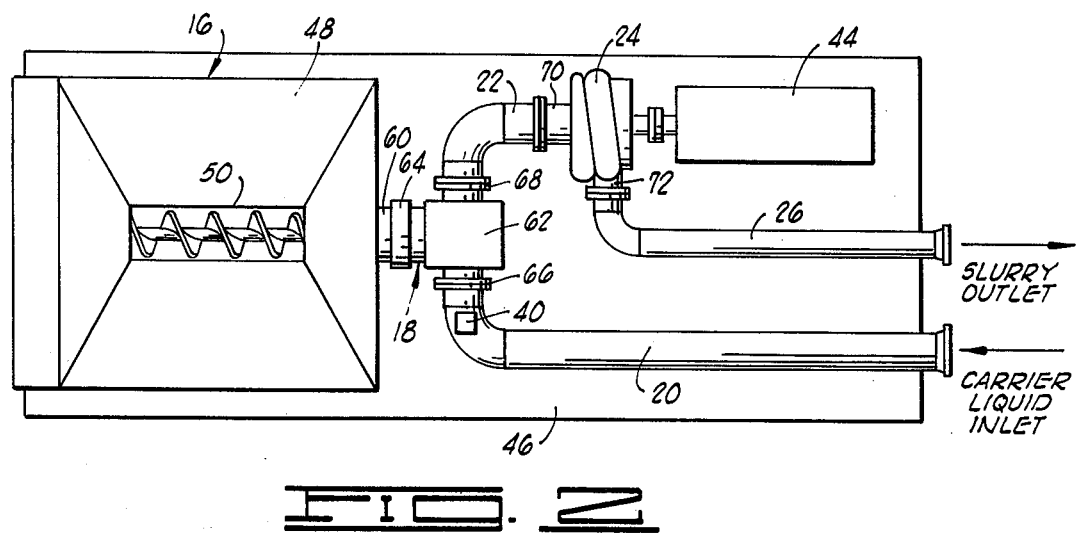
FIG. 2 is a top plan view of a portion of the apparatus illustrated in FIG. 1.
Figure 3:
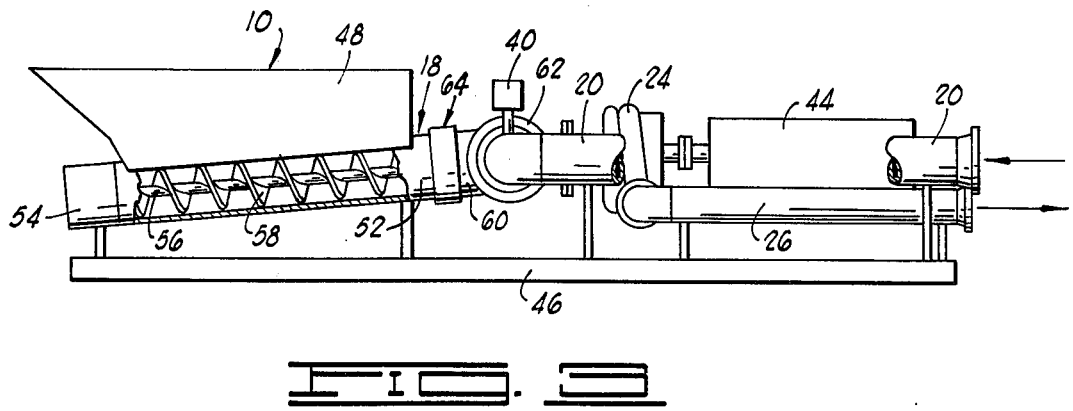
FIG. 3 is a side elevational view of the apparatus of FIG. 2.

Referring now to FIGS. 2 and 3, the feed hopper and conveyor assembly 16 and the slurry pump 24 are illustrated mounted on a base or vehicle 46. The feed hopper and conveyor assembly 16 includes a hopper 48 for receiving particulated solids from the crusher 12 or other source. The hopper 48 has an enlarged inlet at the top and a particulated solids outlet 50 of reduced rectangular shape at the bottom. A screw conveyor 18 is sealingly connected to the outlet 50 of the hopper 48, and as best shown in FIG. 3, the conveyor 18 includes an elongated cylindrical housing 52. A drive motor 54 is mounted at the rearward end of the housing 52 operably connected to a rotatable shaft 56 disposed within the housing 52. The shaft 56 includes a flight of helical fins 58 attached thereto which is arranged so that rotation of the shaft 56 causes the fins 58 to move or convey particulated solids entering the housing 52 from the hopper 48 in a direction toward the forward end 60 of the housing 52.

The forward end 60 of the housing 52 is sealingly attached to a closed cylindrical mixing chamber 62 and a check valve 64 is disposed in the housing 52 adjacent the chamber 62. The check valve 64 can be any of a variety of conventional valves which function to allow the passage of particulated solids from the conveyor 18 into the mixing chamber 62, but prevent the backflow of particulated solids and carrier liquid therethrough. In operation of the hopper and conveyor assembly 16, water can be injected thereinto along with the particulated solids to be transported to displace air from the solids and reduce air entrainment in the carrier liquid.

The mixing chamber 62 includes a carrier liquid inlet connection 66 to which the conduit 20 previously described is attached and a solids-carrier liquid slurry outlet connection 68 to which the conduit 22 is attached. The slurry pump 24 is also mounted on the base or vehicle 46, and the suction connection 70 thereof is connected to the conduit 22. The discharge connection 72 of the pump 24 is connected to the conduit 26 previously described. The pump 24 can be any of a variety of conventional pumps suitable for pumping a solids-liquid slurry, and the driver 44 attached thereto can be a hydraulic, electric or other type of motor which includes a speed reduction gear assembly or other means for increasing or decreasing the speed at which the pump 24 is operated and the flow rate of the solids-liquid slurry pumped thereby.

Operation

As stated above, the apparatus 10 can be utilized in any of a variety of applications where solids are to be transported between first and second locations. When the apparatus 10 is utilized in mining operations wherein a mining machine is employed, the crusher 12 can be mounted on the base or vehicle 46 along with the feed hopper and conveyor assembly 16 and pump 24. However, as will be understood by those skilled in the art, many various alternate arrangements of the apparatus can be made.

A continuous stream of carrier liquid is caused to flow by way of the conduit 20 into the mixing chamber 62. The flow rate of the stream of carrier liquid is controlled at a predetermined level such that when the maximum rate of particulated solids is injected into the mixing chamber 62 by the conveyor 18, the solids-carrier liquid slurry formed is pumpable, and in addition, the flow rate of slurry produced and concentration of solids therein are such that settling of the solids while being transported through the conduit 26 will not occur. Referring specifically to FIG. 1, the flow controller 38 is set to control the flow rate of carrier liquid pumped through the conduit 20 by the pump 32 at the predetermined carrier liquid flow rate required. The flowmeter 34 senses the flow rate of carrier liquid flowing through the conduit 20 and produces a control signal directly proportional thereto. The control device 38 receives the control signal from the meter 34 and generates a second control signal which varies inversely to the difference between the flow rate of carrier liquid flowing through the conduit 20 represented by the control signal produced by the meter 34 and a predetermined set point, i.e., the desired carrier liquid flow rate. The control signal generated by the controller 38 is operably connected to and is used to operate the control valve 36. Thus, the flowmeter 34, controller 38 and control valve 36 function together to maintain the flow rate of carrier liquid pumped through the conduit 20 to the mixing chamber 62 at a constant predetermined level. As will be understood, the flow rate can be varied to accommodate different maximum solid feed rates within limits set by the size of the pumps, pipelines, etc. utilized. As the carrier liquid passes through the mixing chamber 62, the particulated solids and water, if used, injected therein from the conveyor 18 mix with the carrier liquid and a solids-carrier liquid slurry is formed. The slurry flows from the mixing chamber 62 to the suction connection 70 of the pump 24 by way of the conduit 22 from where it is pumped through the conduit 26 to the separator 28.

The pressure transmitter 40 attached to the conduit 20 functions to sense the pressure of the stream of carrier liquid entering the mixing chamber 62 and to generate a control signal in direct proportion thereto. The transmitter 40 can be connected to the conduit 20, the mixing chamber 62 or the conduit 22 so that the pressure level at or near the mixing chamber 62 upstream of the pump 24 is sensed. However, the transmitter 40 is preferably attached to the conduit 20 adjacent the inlet connection 66 of the mixing chamber 62 whereby the pressure level of the carrier liquid just prior to entering the chamber 62 is sensed.

As shown in FIG. 1, the control signal generated by the transmitter 40 is operably connected to a controller 42. The controller 42 functions to generate a second control signal proportional to the difference between the transmitter signal and a set point, i.e., the predetermined carrier liquid pressure level desired. The control signal generated by the controller 42 is operably connected to the driver 44 of the pump 24 in a conventional manner such that changes in the control signal change the speed at which the pump 24 operates, which in turn changes the flow rate of the slurry pumped through the conduit 26 and the pressure level of the carrier liquid and slurry upstream of the pump 24. Thus, the transmitter 40 and controller 42 function to maintain the pressure of the carrier liquid at or near the point of injection of particulated solids thereinto at a predetermined level by increasing or decreasing the speed of the pump 24. In accordance with the present invention, the controller 42 is set to maintain the carrier liquid pressure at a low level so that the injection of particulated solids into the mixing chamber 62 by the conveyor 18 is facilitated and leakage or backflow of carrier liquid and solids through the check valve 64 and conveyor 18 is prevented.

As will be apparent to those skilled in the art, once the operation of the apparatus 10 is commenced, changes in the flow rate of solids transported are handled automatically, i.e., without requiring manual manipulation or control of the conveyor 18 or pumps 24 and 32. The carrier liquid pumped from the second location to the first location by way of the conduit 20 is maintained at a constant flow rate by the control device 38 and the conveyor 18 is operated continuously. The pump 24 pumps the slurry formed when particulated solids are injected into the mixing chamber 62, or carrier liquid without particulated solids suspended therein when solids are not being injected into the mixing chamber 62, at a flow rate such that the slurry or carrier liquid is withdrawn from the mixing chamber 62 at a rate which maintains the pressure level in the mixing chamber 62 at a constant low level. Thus, particulated solids can be introduced into the hopper 48 of the assembly 16 at a high rate, a low rate or not at all without disturbing the operation of the apparatus 10 or requiring manual adjustments. As stated above, the flow rate of carrier liquid flowing through the conduit 20 into the mixing chamber 62 is initially set at a level such that when the maximum rate of solids produced by the conveyor 18 and injected into the mixing chamber 62 results, a pumpable slurry is formed having a solids concentration therein which is capable of carrying the solids through the conduit 26 without settling of the solids.

As will be understood, the carrier liquid utilized may be any of a variety of liquids or compositions suitable for suspending the particulated solids to be transported. In coal mining operations, the carrier liquid is preferably water or an aqueous solution containing additives to facilitate the suspension of coal particles therein.

While presently preferred embodiments of the invention have been described for the purposes of this disclosure, numerous changes in the arrangement of parts and components can be made by those skilled in the art. For example, a plurality of booster pumps can be utilized in the apparatus 10 at different locations and a variety of control systems can be used to maintain the pressure at the mixing chamber 62 at a desired low level while producing a flow rate and concentration of slurry such that settling of solids therefrom is prevented. Such changes are encompasses within the spirit of this invention which is to be limited only by the lawful scope of the appended claims.

What is claimed is:

1. Apparatus for forming and transporting a particulated solids-carrier liquid slurry between first and second locations in a closed carrier liquid-slurry circuit comprising:
    a hopper for receiving said particulated solids at said first location having an inlet and and outlet;
    at least one screw conveyor attached to the outlet of said hopper for receiving particulated solids therefrom, said screw conveyor including a solids discharge connection;
    check valve means sealingly attached to said solids discharge connection of said screw conveyor for allowing the passage of particulated solids from said conveyor therethrough, but preventing the backflow of particulated solids and carrier liquid into said conveyor;
    a closed solids carrier-liquid slurry mixing chamber having a solids inlet connection sealingly connected to said check valve means, a carrier liquid inlet connection and a solids-carrier liquid slurry outlet connection;
    first conduit means connected to said carrier liquid inlet connection of said mixing chamber for conducting a continuous stream of carrier liquid thereinto;
    a solids-carrier liquid slurry pump having suction and discharge connections;
    second conduit means connected between the solids-carrier liquid slurry outlet connection of said mixing chamber and the suction connection of said pump;
    third conduit means for conducting said solids-carrier liquid slurry to said second location connected to the discharge connection of said pump; and
    means attached to said pump for controlling the flow rate at which said solids-carrier liquid slurry is pumped through said third conduit means in direct proportion to changes in the pressure of said stream of carrier liquid upstream of said pump so that said pressure is controlled at a predetermined level.

2. The apparatus of claim 1 which is further characterized to include separator means for separating said particulated solids from said carrier liquid at said second location, said separator means having a solids-carrier liquid slurry inlet connection connected to said third conduit means, a separated solids outlet connection and a separated carrier liquid outlet connection.

3. The apparatus of claim 2 which is further characterized to include:
   a carrier liquid pump having suction and discharge connections, said discharge connection being connected to said first conduit means; and
   a fourth conduit means connected between said separated carrier liquid outlet connection of said separator and said suction connection of said carrier liquid pump.

* * * * *